Oct. 24, 1967  J. F. BUFFINGTON  3,349,316
STATIC PHASE CONVERTER
Filed Feb. 23, 1965
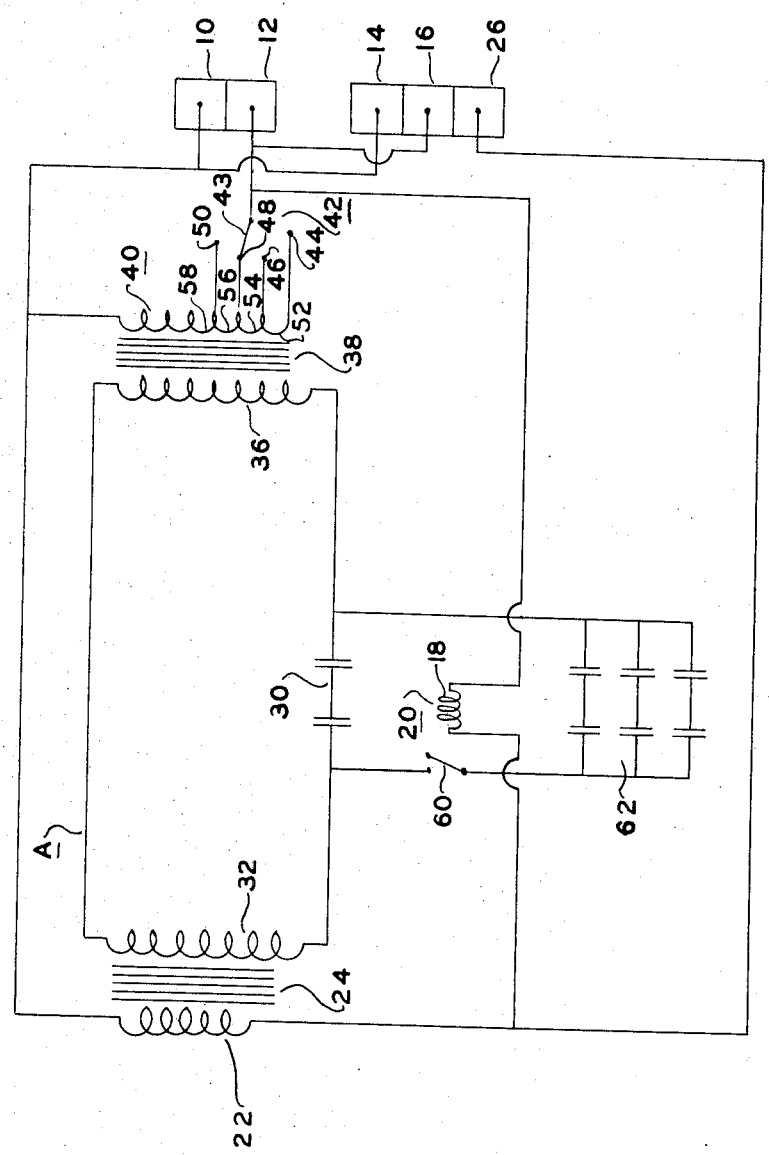
INVENTOR.
JAMES F. BUFFINGTON
BY M. A. Hobbs
ATTORNEY 3,349,316
STATIC PHASE CONVERTER
James F. Buffington, R.R. 3, Plymouth, Ind. 46563
Filed Feb. 23, 1965, Ser. No. 434,209
6 Claims. (Cl. 321—52)

ABSTRACT OF THE DISCLOSURE

A static phase converter having an input, a relay and a step-up transformer including primary and secondary windings, for converting a single phase input into a three phase output, in which the primary of the transformer is connected in series with the coil of the relay, and the input and a capacitor are connected to the secondary winding of the transformer. In the circuitry, a switch operated by the relay and a capacitor connected to the switch are connected in parallel with the first mentioned capacitor.

---

At present, phase converters may be generally classified as either rotary converters or static converters. In a rotary converter, one phase of the primary of a polyphase induction motor having a squirrel cage or phase wound rotor is connected to a single phase source of power. Once it is starter, this motor runs as a single phase motor, and with no load its speed is practically synchronous with the input. However, if a polyphase load is connected to the primary windings of the motor, polyphase currents can be taken off the motor to run a load.

In a static converter, energy storing devices such as an inductor or choke coil and a capacitor connected in series across the terminals of a single phase alternating current supply are utilized to store energy and release it 120 degrees out of phase with the input supply. In general, two of the three output lines can be identical to the input. The third, or manufactured output line is connected to the point of junction of the two energy storing devices and is thus provided with an output that is 120 degrees out of phase with both of the other two lines, for appropriate values of the capacitor and inductor chosen in conjunction with the value of the load connected to the output of the converter.

Each of the two types of conventional phase converters has several advantages and disadvantages. The rotary converter tends to compensate for minor variations in line voltage and load, while the static converter usually has the advantages of simplicity and the lack of moving parts to wear and require replacement. However, the simple static converter described is extremely unstable, the voltages displaced in phase impressed upon the load circuit being considerably varied both as regards phase relations and magnitude by any alteration in load. While complex electronic circuits have been used to overcome these disadvantages, the complicated circuitry itself eliminates the major advantages of simplicity and extreme reliability of the simple static converter.

In addition, the capacitor used in a static converter is conventionally quite large in value, due to the low voltage used and the occasional high power requirement placed on it by starting of the original load and any additional loads which may, from time to time, be placed on the device. Therefore, the primary objects of the present invention are to provide a static converter which is stable and is yet simple and which utilizes a low value capacitor, thus having a reduced cost from the conventional converter.

A further object of the invention is to provide such a converter which automatically provides a power surge for starting the load and for compensating for sudden increases in the load.

In many installations, the number of motors being run from the current from a converter is changed from time to time. Since the power requirement of a motor can be quite high, these changes present large variations in the load of the converter. Therefore, another object of the present invention is to provide a phase converter which may be readily and easily made to compensate for very large variations in the load.

An additional object of the invention is to provide a static converter of the above type which is simple, inexpensive and reliable and is yet manufactured from readily available components.

Additional objects and advantages will become apparent from the following description and accompanying drawing, wherein:

The sole figure is a schematic diagram of the circuit of the present invention.

In the figure, numerals 10 and 12 designate a 110-volt alternating current input, it being understood that the particular voltage values named herein are used only for illustrative purposes. Inputs 10 and 12 are connected directly to output terminals 14 and 16, respectively. In addition, the inputs are connected together through winding 18 of relay 20 and primary coil 22 of transformer 24 connected in series between terminals 10 and 12. A third output 26, or manufactured line, is connected to the junction between coil 22 and winding 18. Coil 22 in conjunction with a circuit A, to be described hereinafter, acts as a capacitor, and winding 18 as a choke to provide static conversion as described previously.

Coil 22 is the primary of a transformer 24 which couples circuit A, including a capacitor 30 to the conversion circuit through the agency of secondary 32 of transformer 24 connected in series with the capacitor. As indicated in the figure, transformer 24 is of the step-up type; the increased voltage of, for example, 1000 volts across capacitor 30 allows the use of a considerably smaller value of capacitance for a given load imposed on the converter than in the conventional converter.

The load handling capacity of a static converter depends on the values of the capacitor and choke supplying the manufactured line. As the load varies with no change in these values, both the amplitude of the voltage supplied to the manufactured line and the phase of this voltage vary. With the provision of circuit A, the voltage in circuit A joins the values of the capacitor and the choke as a determining factor in the power handling capacity of the converter. To provide greater control and stability, the secondary 36 of a step-up transformer 38, usually identical with transformer 24, is connected in series between capacitor 30 and secondary 32. Primary 40 of transformer 38 is connected in series with a manually variable switch 42 between inputs 10 and 12, with the wiper arm 43 of switch 42 connected to input 12. Contacts 44, 46, 48 and 50 of switch 42 are connected to coils 52, 54, 56 and 58, respectively, of primary 40; although these coils are shown in the figure as being adjacent, they may be any desired coils of primary 40 to provide the desired control of the voltage in circuit A. For various values of load placed on the converter, wiper 43 of switch 42 is connected to different contacts 44, 46, 48 or 50 to provide the phase and constant average voltage in output 26 desired.

Occasionally, the load connected to a converter may suddenly and temporarily increase; that is, a surge of power may be called for by the load as a motor is started or a machine is thrown into gear. This surge can collapse the voltage in the manufactured line to 10 or 15 percent of the incoming single phase voltage for a short period, thus resulting in loss of efficiency and perhaps even damage to sensitive devices. Therefore, switch 60 of relay 20 and a bank of capacitors 62 are connected together in series and the combination further connected in parallel with capacitor 30 in a circuit A. When the converter is in operation, switch 60 is normally held open by relay 20, thus preventing capacitors 62 from affecting the output. However, when the load becomes too great and the voltage in output line 26 is drastically reduced, the voltage across winding 18 is reduced and switch 60 closes, thus allowing capacitors 62 to enter circuit A and force the voltage in line 26 back to approximately its normal value and the phase into a semblance of the correct relation. Since the relay opens switch 60 when the voltage rises to its former value, the effect of capacitor bank 62 is to automatically provide a momentary surge of power when it is required by the load. If the load is still too high, the relay will act as a buzzer to provide an emergency warning; however, the construction is not intended for this purpose and a true warning system should be installed if trouble is anticipated.

In the operation of the present device, before turning on the converter, switch 42 is set to provide the voltage in circuit A and hence the load capacity of the converter which is required. When power flows into inputs 10 and 12, capacitors 62 are in circuit A to provide a starting surge of power in the manufactured line; thereafter, switch 60 snaps open and relay 20 acts as a choke in conjunction with circuit A to provide a steady third phase of power for the output. When the load on the converter is changed, switch 42 is adjusted to provide the correct phase and voltage adjustments. If a load is being added to the converter, the instant the additional load is placed on the converter, switch 60 closes to provide a momentary surge of power to start the load. Finally, if the load is suddenly and unexpectedly increased, capacitors 62 are available to help with a momentary surge of power. When the converter is stopped, switch 60 automatically closes, thus draining capacitors 62 and rendering the converter safe for handling and repairs.

Although the invention has been described in detail herein, it is to be understood that the description is for the purpose of illustration only and is not definitive of the limits of the inventive idea.

I claim:

1. A static phase converter, comprising a pair of inputs, a relay, a step-up transformer, the primary of said transformer being connected in series with the coil of said relay between said inputs, an output connected to the junction between said primary and said coil, a capacitor connected to the secondary of said transformer, a second step-up transformer, the secondary of said second transformer being connected in series between said capacitor and the secondary of said first mentioned transformer, a multi-position switch, the primary of said second transformer and said switch being connected in series between said inputs, a normally closed switch operated by said relay, and a capacitor connected to said second mentioned switch in series, said second mentioned switch and said second mentioned capacitor being connected in parallel with said first mentioned capacitor.

2. A static phase converter, comprising an input, a relay, a step-up transformer, the primary of said transformer being connected in series with the coil of said relay to said input, an output connected to the junction between said primary and said coil, a capacitor connected to the secondary of said transformer, a second transformer, the secondary of said transformer being connected in series between said capacitor and the secondary of said first mentioned transformer, the primary of said second transformer being connected to said input, a switch operated by said relay, and a capacitor connected to said switch in series, said switch and said second mentioned capacitor being connected in parallel with said first mentioned capacitor.

3. A phase converter, comprising an input, a relay, a step-up transformer having primary and secondary windings separate circuits for each of said windings, the primary of said transformer being connected in series with the coil of said relay to said input, a capacitor connected to the secondary of said transformer, a switch operated by said relay, and a capacitor connected to said switch, said switch and said second mentioned capacitor being connected in parallel with said first mentioned capacitor.

4. A phase converter, comprising an input, a choke, a step-up transformer, the primary of said transformer being connected in series with said choke to said input, an output connected to the junction between said primary and said choke, a capacitor connected to the secondary of said transformer, a second step-up transformer, the secondary of said second transformer being connected in series between said capacitor and the secondary of said first mentioned transformer, and a multi-position switch, the primary of said second transformer and said switch being connected to said input.

5. A phase converter, comprising an input, a choke, a transformer, the primary of said transformer being connected in series with said choke to said input, a capacitor connected to the secondary of said transformer, a second transformer, the secondary of said second transformer being connected in series between said capacitor and the secondary of said first mentioned transformer, and a switch, the primary of said second transformer and said switch being connected in series to said input.

6. A phase converter, comprising an input, a choke, a transformer, the primary of said transformer being connected in series with said choke to said input, a capacitor connected to the secondary of said transformer, and a second transformer, the secondary of said second transformer being connected in series between said capacitor and the secondary of said first mentioned transformer, and the primary of said second transformer being connected to said input.

References Cited

UNITED STATES PATENTS

| | | | |
|---|---|---|---|
| 2,677,096 | 4/1954 | Holcomb | 321—57 X |
| 2,832,925 | 4/1958 | Koll et al. | 321—51 X |
| 3,202,896 | 8/1965 | Lewis | 318—218 |

JOHN F. COUCH, *Primary Examiner.*

G. GOLDBERG, *Assistant Examiner.*